(12) United States Patent
Abele et al.

(10) Patent No.: US 10,493,947 B2
(45) Date of Patent: Dec. 3, 2019

(54) ADAPTIVE KNEE AIRBAG FOR VEHICLE OCCUPANT RESTRAINT DEVICE

(71) Applicant: TRW Automotive GmbH, Alfdorf (DE)

(72) Inventors: Timo Abele, Abtsgmund (DE); Werner Frelsler, Heubach (DE); Sven Oliver Tamme, Ostfildern (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 355 days.

(21) Appl. No.: 14/404,961

(22) PCT Filed: May 29, 2013

(86) PCT No.: PCT/EP2013/001586
§ 371 (c)(1),
(2) Date: Dec. 2, 2014

(87) PCT Pub. No.: WO2013/182282
PCT Pub. Date: Dec. 12, 2013

(65) Prior Publication Data
US 2015/0123385 A1     May 7, 2015

(30) Foreign Application Priority Data
Jun. 5, 2012  (DE) .................. 10 2012 011 035

(51) Int. Cl.
*B60R 21/239*   (2006.01)
*B60R 21/231*   (2011.01)
*B60R 21/2338*  (2011.01)

(52) U.S. Cl.
CPC .......... *B60R 21/239* (2013.01); *B60R 21/231* (2013.01); *B60R 21/2338* (2013.01);
(Continued)

(58) Field of Classification Search
CPC . B60R 21/206; B60R 21/233; B60R 21/2338; B60R 21/239;
(Continued)

(56) References Cited

U.S. PATENT DOCUMENTS 4,290,627 A * 9/1981 Cumming ............. B60R 21/233
                                                                280/729
5,240,283 A * 8/1993 Kishi ................... B60R 21/233
                                                                280/729
(Continued)

FOREIGN PATENT DOCUMENTS

| DE | 102004009013 | 9/2005 |
|---|---|---|
| DE | 102007053591 | 5/2009 |
| EP | 1279565 | 1/2003 |

*Primary Examiner* — Barry Gooden, Jr.
(74) *Attorney, Agent, or Firm* — Tarolli, Sundheim, Covell & Tummino LLP (57) ABSTRACT

A knee airbag for a vehicle occupant restraint device can adopt a deployed position of use between a fixed vehicle component and the legs of a vehicle occupant. The airbag includes an airbag sheath, at least one exhaust orifice formed therein and control features for selectively releasing the exhaust orifice. The control features are disposed inside the knee airbag and arranged so as to release or block the exhaust orifice depending on the expansion of the knee airbag in a particular direction of expansion.

18 Claims, 7 Drawing Sheets

(52) U.S. Cl.
CPC ............... *B60R 2021/2395* (2013.01); *B60R 2021/23169* (2013.01); *B60R 2021/23382* (2013.01); *B60R 2021/23384* (2013.01)

(58) Field of Classification Search
CPC .......... B60R 2021/23169; B60R 2021/23382; B60R 2021/23384; B60R 2021/2395; B60R 2021/23324; B60R 2021/23332; B60R 2021/23308
See application file for complete search history.

(56) References Cited

U.S. PATENT DOCUMENTS

| | | | | |
|---|---|---|---|---|
| 5,765,863 | A * | 6/1998 | Storey | B60R 21/207 280/729 |
| 6,932,385 | B2 * | 8/2005 | Hawthorn | B60R 21/233 280/736 |
| 7,192,050 | B2 * | 3/2007 | Sato | B60R 21/23138 280/729 |
| 7,445,237 | B2 * | 11/2008 | Boyle, III | B60R 21/233 280/739 |
| 7,883,110 | B2 * | 2/2011 | Pausch | B60R 21/2338 280/739 |
| 7,954,850 | B2 * | 6/2011 | Fischer | B60R 21/233 280/738 |
| RE43,353 | E * | 5/2012 | Schneider | B60R 21/233 280/732 |
| 8,262,130 | B2 * | 9/2012 | Fischer | B60R 21/233 280/739 |
| 9,199,602 | B1 * | 12/2015 | Fischer | B60R 21/239 |
| 2002/0158456 | A1 * | 10/2002 | Fischer | B60R 21/205 280/743.2 |
| 2005/0184493 | A1 | 8/2005 | Hofmann et al. | |
| 2006/0186656 | A1 * | 8/2006 | Kumagai | B60R 21/231 280/743.2 |
| 2007/0108750 | A1 | 5/2007 | Bauer et al. | |
| 2007/0145729 | A1 * | 6/2007 | Ishiguro | B60R 21/239 280/739 |
| 2007/0246920 | A1 * | 10/2007 | Abele | B60R 21/206 280/730.1 |
| 2008/0315567 | A1 * | 12/2008 | Fischer | B60R 21/233 280/732 |
| 2010/0001498 | A1 | 1/2010 | Abe et al. | |
| 2010/0019473 | A1 * | 1/2010 | Dennis | B60R 21/206 280/729 |
| 2010/0140910 | A1 * | 6/2010 | Fischer | B60R 21/233 280/743.2 |
| 2010/0187797 | A1 * | 7/2010 | Debler | B60R 21/2338 280/737 |
| 2011/0031723 | A1 * | 2/2011 | Fischer | B60R 21/233 280/730.1 |
| 2011/0109070 | A1 | 5/2011 | Tanaka et al. | |
| 2011/0140401 | A1 * | 6/2011 | Fischer | B60R 21/233 280/743.1 |
| 2011/0198828 | A1 * | 8/2011 | Fischer | B60R 21/233 280/743.2 |
| 2012/0104737 | A1 * | 5/2012 | Fischer | B60R 21/2338 280/742 |
| 2012/0235393 | A1 * | 9/2012 | Fisher | B60R 21/2338 280/742 |
| 2013/0026744 | A1 * | 1/2013 | Fischer | B60R 21/2338 280/742 |
| 2013/0038046 | A1 * | 2/2013 | Inuzuka | B23D 15/145 280/743.2 |
| 2013/0134697 | A1 * | 5/2013 | Choi | B60R 21/239 280/743.2 |
| 2013/0334801 | A1 * | 12/2013 | Williams | B60R 21/239 280/739 |
| 2015/0283971 | A1 * | 10/2015 | Fischer | B60R 21/2338 280/742 |

* cited by examiner

ADAPTIVE KNEE AIRBAG FOR VEHICLE OCCUPANT RESTRAINT DEVICE

RELATED APPLICATIONS

This application corresponds to PCT/EP2013/001586, filed May 29, 2013, which claims the benefit of German Application No. 10 2012 011 035.9, filed Jun. 5, 2012, the subject matter of which are incorporated herein by reference in their entirety.

BACKGROUND OF THE INVENTION

The invention relates to a knee airbag for a vehicle occupant restraint device. The invention further relates to a vehicle occupant restraint device comprising such knee airbag.

The inflation and exhaust behavior of airbags is tested with crash test dummies during impact tests. Crash test dummies are life-size dolls imitating the human body. In order to duly consider the different anatomic conditions of real persons during simulations, the tests are usually carried out with three different dummies: The "50 percent male" having a body height of 175 cm and a weight of 78 kg is supposed to correspond in general to a "normally" sized vehicle occupant, the "95 percent male" having a body height of 188 cm and a weight of 101 kg is supposed to correspond to a tall vehicle occupant and the "5 percent female" having a body height of 152 cm and a weight of 54 kg is supposed to correspond to a short vehicle occupant. Due to the different constitution, in the crash tests the normal seating positions of the different dummies vary accordingly.

From DE 10 2004 009 013 A1 a side impact restraint device for the protection of an occupant seated on a vehicle seat in a vehicle comprising an airbag is known which adapts to the build of the vehicle occupant. The airbag deploys between a side structure of the vehicle and the vehicle occupant and includes a first exhaust orifice disposed in an area of the airbag facing the vehicle occupant. The vertical position of the exhaust orifice is selected so that it is not covered by the upper body part of a short vehicle occupant, but that it is covered by a tall vehicle occupant. Thus for a short vehicle occupant a lower internal pressure is provided in the airbag than for a tall vehicle occupant.

In EP 1 279 565 A1 a generic knee airbag for an occupant protection device is shown in which a venting hole is provided in an upper end portion. The venting hole interacts with a passenger airbag disposed above the knee airbag. When the legs of the vehicle occupant hit the deployed knee airbag and the venting hole initially is not yet covered by the passenger airbag, gas can exhaust from the venting hole. In this way the impact exerted on the vehicle occupant is dampened. As soon as the deployed passenger airbag covers the venting hole, however, the gas discharge from the venting hole is restricted so that a minimum internal pressure of the knee airbag is retained for a longer period of time.

SUMMARY OF THE INVENTION

It is the object of the invention to permit adaptation of the protective effect of an inflated knee airbag to the build of a vehicle occupant.

This object is achieved by a knee airbag for a vehicle occupant restraint device comprising the features of claim 1. Advantageous and expedient configurations of the knee airbag according to the invention are described in the related subclaims.

The knee airbag according to the invention for a vehicle occupant restraint device can adopt a deployed position of use between a fixed vehicle component and the legs of a vehicle occupant. The knee airbag comprises an airbag sheath, at least one exhaust orifice formed therein and a control means for selectively releasing the exhaust orifice. The control means is disposed inside the knee airbag and is arranged to release or block the exhaust orifice depending on the expansion of the knee airbag in a particular expansion direction.

The invention is based on the principal idea that by adapting the internal pressure of the knee airbag to the physical constitution of the respective vehicle occupant an improved protective effect can be achieved. Compared to complicated "active" solutions requiring e.g. an electronic occupant qualification and a multistage inflator, a "passive" solution can be realized in a definitely more inexpensive manner.

Starting from this basic idea, the present invention is based on the finding that the distance between the lower part of the instrument panel from which a knee airbag usually deploys and the legs of the vehicle occupant in a normal seating position depends on the build of the vehicle occupant. This is also allowed for in crash tests with dummies: Said distance is smaller in tests with 5 percent dummies (corresponding to a short vehicle occupant) than in tests with a 50 percent dummy (corresponding to a normal-sized vehicle occupant).

The control means of the knee airbag according to the invention for selectively releasing the exhaust orifice ensures that the exhaust orifice releases or blocks depending on the expansion of the knee airbag (in the direction of the vehicle occupant). So in the case of a small vehicle occupant who admits only limited expansion of the knee airbag due to the small distance of his/her legs from the instrument panel, the exhaust orifice can be released so as to dampen the impact on the knee airbag. On the other hand, in the case of a normal-sized vehicle occupant the airbag can fully deploy in the direction of the vehicle occupant due to the larger leg space, thereby causing the control means to block the exhaust orifice. The internal pressure of the airbag then remains on a high level for a longer period. Thus, independently of the build of the vehicle occupant, always the same amount of gas can be used for inflating the knee airbag as the internal pressure adapts automatically. An occupant qualification or a multistage inflator is not required for the solution according to the invention. In addition, the arrangement of the control means inside the knee airbag offers the advantage that no additional working steps are necessary for mounting the knee airbag.

Following the passive basic concept of the invention, a passive detection of the degree of expansion of the knee airbag in the direction of the vehicle occupant is provided from which the distance of the legs of the vehicle occupant from the instrument panel and thus his/her build can be concluded. According to a preferred embodiment of the invention, for this the control means includes a tether which can restrict the deployment of the knee airbag in the relevant direction of expansion. Advantageous is a design of the tether, especially of its length, in such way that with an expansion of the knee airbag unobstructed (from outside) in the direction of the vehicle occupant solely the inner tether restricts the deployment from which a (normally) sized vehicle occupant can be concluded. In the case of a short vehicle occupant, on the other hand, the deployment should not be restricted by the tether but already before by the legs of the vehicle occupant. With such design the extension of the tether thus can serve as criterion for distinguishing between a short and a (normally) sized vehicle occupant.

In order to ensure this functionality of the tether, a design is offered in which the tether is fastened, on the one hand, to a portion of the airbag sheath opposed to the vehicle component and, on the other hand, to a portion of the airbag sheath opposed to the vehicle occupant, related to the position of use of the knee airbag.

For selectively closing the exhaust orifice the control means preferably includes a closing member, especially in the form of a flap, and a tensile means coupled on the one hand to the tether and on the other hand to the closing member. By such constructional design, the afore-described different behavior of the tether can be efficiently used for automatic "operation" of the closing member for short and (normally) sized vehicle occupants.

Within the scope of this control concept, an embodiment is advantageous in which one end of the tensile means is detachably fastened in or on a fold of the tether, preferably by a tear seam. In the case of a short vehicle occupant, due to the restriction of the airbag expansion caused by the occupant him-/herself the forces acting upon the fold and the tear seam are so low that the tensile means is held tensioned in a position in which it keeps the closing member away from the exhaust orifice. In the case of a tall vehicle occupant the load of the tether is so high, on the other hand, that the tear seam tears open and releases the tensile means. When the tensile means is no longer tensioned, the closing member automatically adopts a blocking position in which it closes the exhaust orifice.

In order to bring about such behavior of the closing member the closing member can be designed as flap so that an edge portion of the flap is connected to the airbag sheath, while a free portion of the flap is coupled to the tensile means. When the tensile means detaches from the tether, the flap held tight before then may fold automatically.

In order to ensure that the flap folds into the right direction, viz. onto the exhaust orifice, according to a special aspect of the invention it is provided that the edge portion is fastened to the airbag sheath by a seam having a curved path. In interaction with the forces acting in the airbag sheath during expansion and, resp., in the completely inflated state of use of the knee airbag the curvature of the seam path determines a clear folding direction. Thus swiveling of the flap in a direction opposed to the desired direction is practically excluded.

According to an especially preferred configuration and arrangement of the flap, the path of the seam substantially corresponds to a circular arc of a circle surrounding the exhaust orifice or to a corresponding arc of an ellipse or a similar angular path. Such seam path ensures that the free portion of the flap folds exactly onto the exhaust orifice and safely closes the latter.

An arrangement of the exhaust orifice in the upper area of the knee airbag, preferably in the upper third related to the position of use of the knee airbag, offers the advantage that a tensile means orientated more or less perpendicularly to the expansion of the tether can be used. In a configuration in which the tensile means is coupled to the tether this permits optimum force transmission to the tensile means. However, also an arrangement of the exhaust orifice in the lower or in another area of the knee airbag is basically possible.

Also embodiments of the airbag according to the invention are possible the control means of which do not necessarily require a tether for selectively releasing the exhaust orifice. In these embodiments it is provided that the control means includes a closing member for selectively closing the exhaust orifice, with a tensile means whose tension depends on the expansion of the knee airbag in the particular direction of expansion acting on the closing member. Depending on how strongly the tensile means is tensioned during and after deployment of the knee airbag, the closing member is removed from the exhaust orifice so that the exhaust orifice is released or not. Basically also intermediate positions are possible.

According to an advantageous configuration, the closing member includes at the outer periphery one or more inwardly protruding recesses. In the peripheral direction only the area outside the recess and, resp., only the areas between the recesses is/are connected to the edge of the exhaust orifice. Such configuration permits on the one hand fastening the closing member safely to the edge of the exhaust orifice and on the other hand ensuring that with a tensile effect on the closing member gas may exhaust through the recesses past the withdrawn closing element.

Another advantageous embodiment provides an exhaust portion folded into the interior of the knee airbag as closing member, the exhaust orifice being provided in this exhaust portion. As long as the exhaust portion including the exhaust orifice is retained in the interior of the airbag by the tensile means, no gas can flow off. However, when the tensile means is not put under tension, the exhaust portion may unfold and thereby release the exhaust orifice.

In another special embodiment of the knee airbag according to the invention the tensile means is disposed between two connecting points so that by an externally caused deformation of the knee airbag the distance of the tensile means between the two connecting points is shortened. This means that an interaction of the knee airbag with the legs or knees of the vehicle occupant during deployment of the airbag causes relaxation of the tensile means. In this way the exhaust orifice can be deliberately released, as afore-described, so as to allow reduction of the internal pressure of the airbag.

Such behavior can be obtained, for example, in that the tensile means is guided through loops which are disposed, related to the position of use of the knee airbag, in transverse direction alternately on an airbag wall facing the fixed vehicle component and an airbag wall facing the legs of the vehicle occupant. In this way a zigzag path of the tensile means is resulting the "amplitude" of which is reduced when the legs or knees of the vehicle occupant impede the deployment of the airbag.

The internal pressure of the knee airbag can be adapted even better to the actual conditions by designing the control means so that the effective exhaust cross-section of the exhaust orifice depends on the expansion of the knee airbag in the particular expansion direction.

The gas escaping through the exhaust orifice can be discharged either directly to the ambience or into an overflow chamber for the protection of the vehicle occupant. In the latter case the exhaust orifice does not open to the atmosphere but into the dedicated overflow chamber.

The invention also provides a vehicle occupant restraint device comprising a knee airbag according to the invention. In the vehicle occupant restraint device according to the invention the knee airbag is installed so that the expansion direction, i.e. the direction of airbag expansion, in dependence on which the exhaust orifice is released or blocked, points from the fixed vehicle component to the legs of the vehicle occupant.

Moreover, with respect to the concrete mounting situation of the vehicle occupant restraint device according to the invention, it should be ensured that in an embodiment in which the expansion of the knee airbag is "determined" via a tether the length of the portion of the tether extending between the opposite walls of the knee airbag is larger than the minimum distance of the fixed vehicle component from the legs of a short vehicle occupant but smaller than the corresponding distance from the legs of a normal-size vehicle occupant.

BRIEF DESCRIPTION OF THE DRAWINGS

Further features and advantages of the invention are evident from the following description and from the enclosed drawings which are referred to. The drawings schematically show in.

DESCRIPTION OF EMBODIMENTS

Figure 1:
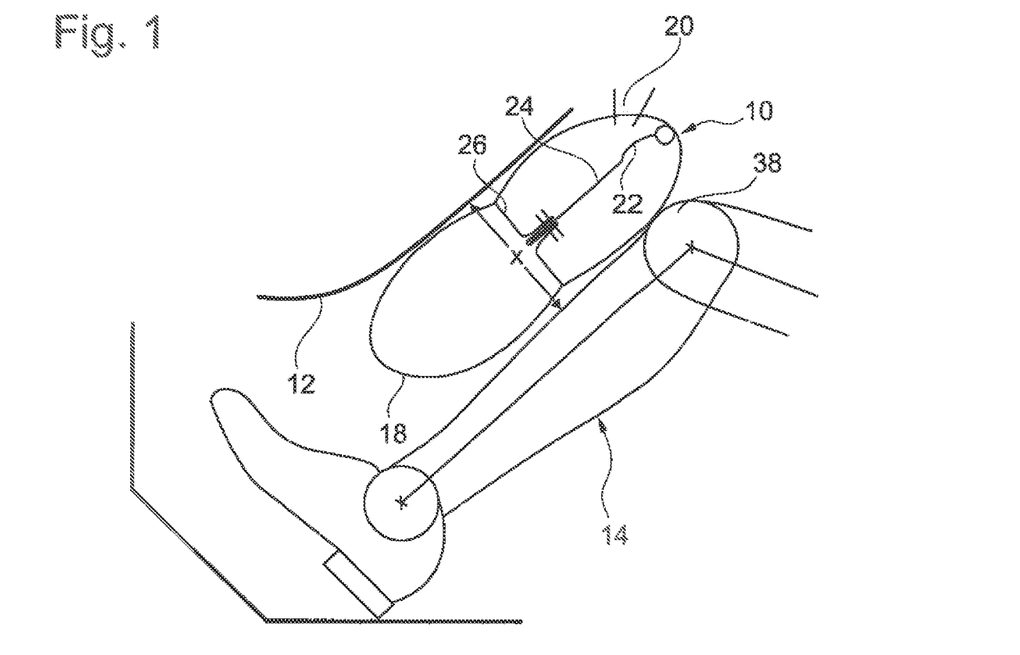
FIG. 1 an interaction of a short vehicle occupant with an inflated knee airbag according to the invention in a vehicle according to a first embodiment.
Figure 2:
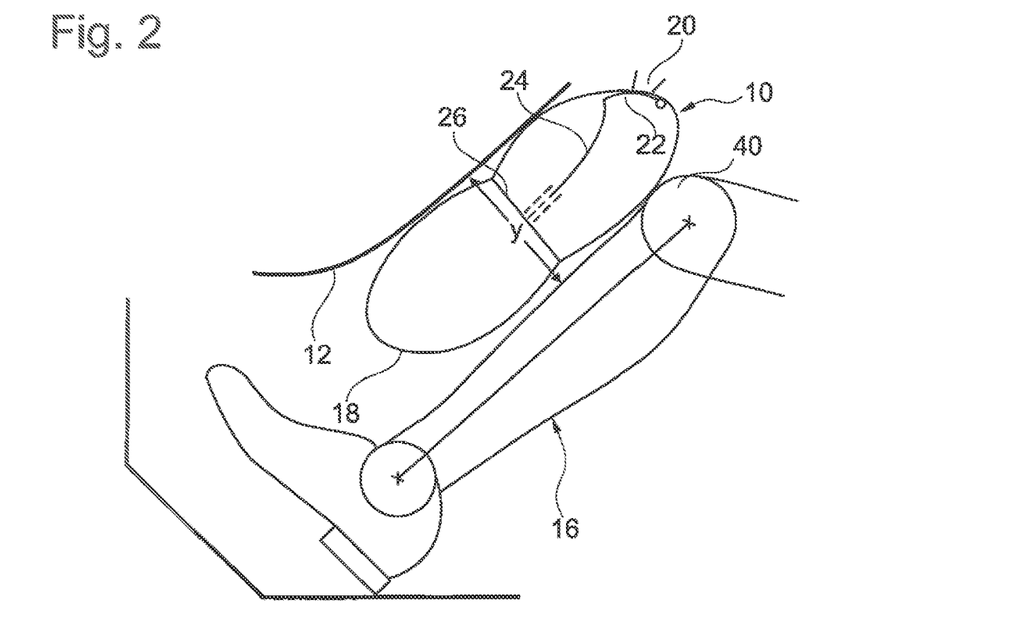
FIG. 2 an interaction of a normal-size vehicle occupant with an inflated knee airbag according to the invention according to the first embodiment.

In each of the FIGS. 1 and 2 a knee airbag 10 of a vehicle occupant restraint device in a vehicle is illustrated which has deployed out of an acceptance between the lower part of the instrument panel 12 of the vehicle and the legs 14 and, resp., 16 of a vehicle occupant. The position of the knee airbag 10 illustrated in FIGS. 1 and 2 after complete inflation by an inflator will hereinafter be referred to as position of use of the knee airbag 10 to which the indications of "upper", "lower" etc. refer.

The knee airbag 10 is substantially formed of an airbag sheath 18 in which at least one exhaust orifice 20 is formed through which gas may escape from the knee airbag 10 under certain circumstances which will be discussed in detail below. The exhaust orifice 20 is arranged in the upper area of the knee airbag 10, more exactly speaking in the upper third related to the position of use of the knee airbag 10.

The exhaust orifice 20 can be covered by a closing member, here in the form of a flap 22, disposed inside the knee airbag 10. A flexible tensile means 24, e.g. in the form of a ribbon or a string, inter alia serves for controlling the flap 22. A first end of the tensile means 24 is connected to the flap 22 and the second end is connected to a tether 26 equally disposed inside the knee airbag 10 and provided for restricting the deployment of the knee airbag 10 in the direction of the vehicle occupant. For this purpose, the tether 26 is fastened on the one hand to a portion of the airbag sheath 18 opposed to the instrument panel 12 and on the other hand to a portion opposed to the vehicle occupant.

Figure 3:
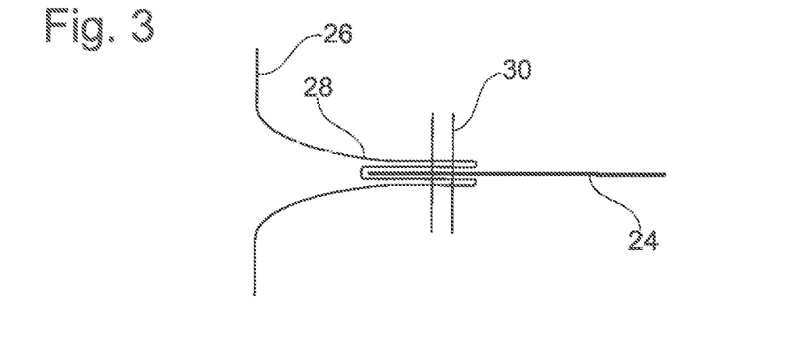
FIG. 3 the connection of the tensile means to the tether of the knee airbag according to the invention in accordance with the first embodiment in detail.
Figure 4:
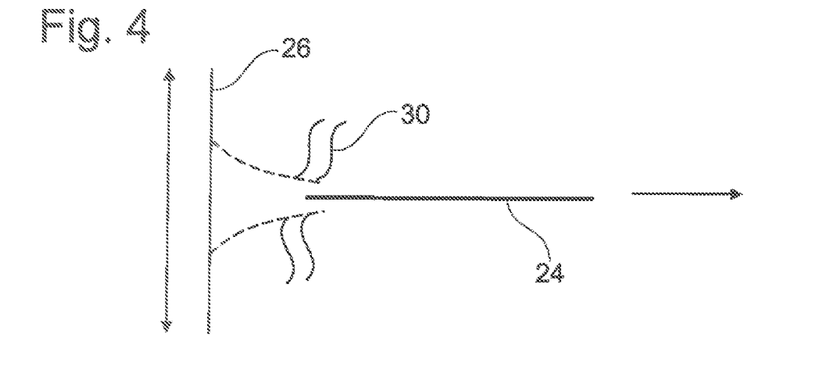
FIG. 4 the release of the tensile means when the tether is stressed.

The connection of the tensile means 24 to the tether 26 is shown in detail in FIG. 3. The second end of the tensile means 24 is stitched into or onto a fold 28 of the tether 26. The seam 30 used for this is a tear seam that does not withstand a predetermined stress and tears open. Especially when a particular force acts on the tether 26 in the longitudinal direction thereof and the fold 28 is accordingly strongly pulled apart, the seam 30 tears and releases the second end of the tensile means 24 as FIG. 4 illustrates.

Figure 5:
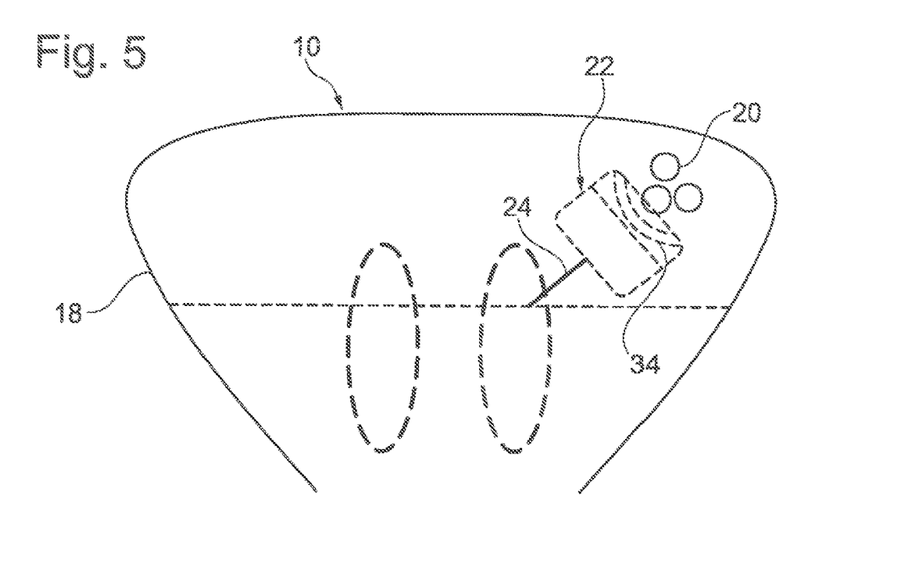
FIG. 5 a top view of a spread knee airbag according to the invention in accordance with the first embodiment with released exhaust orifices.
Figure 6:
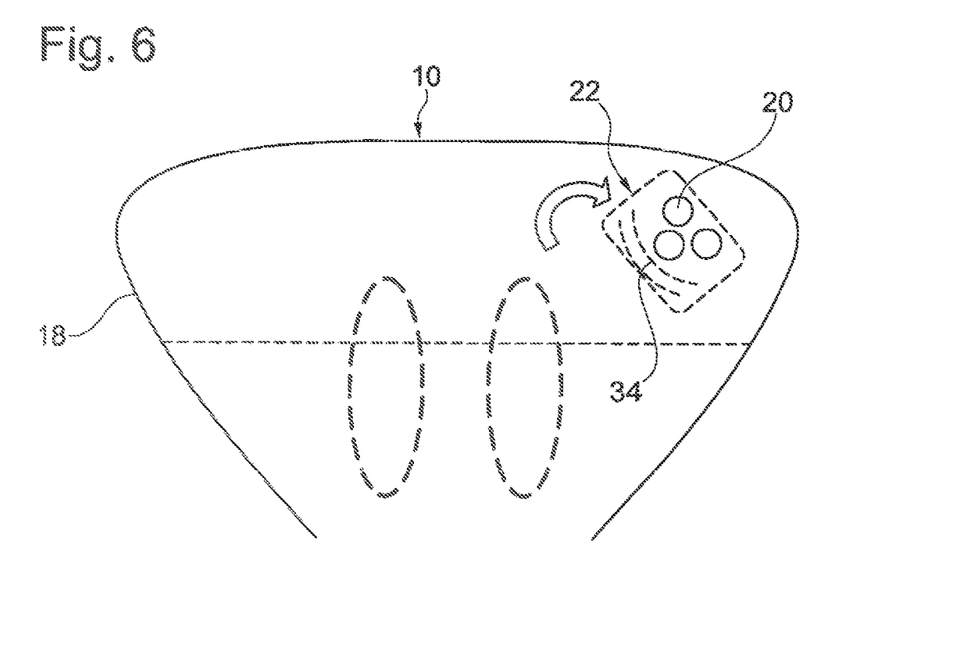
FIG. 6 a top view of a spread knee airbag according to the invention in accordance with the first embodiment with blocked exhaust orifices.
Figure 7:
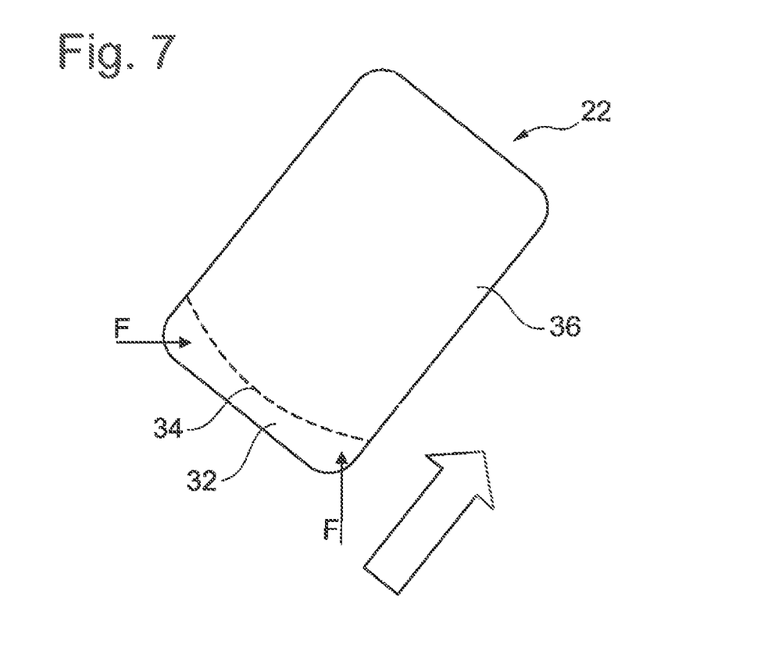
FIG. 7 a detail view of the flap of a knee airbag according to the invention in accordance with the first embodiment.

The flap 22 for covering the one or more exhaust orifices 20 is shown in FIGS. 5 and 6 in different positions and in FIG. 7 in detail. The flap 22 includes an edge portion 32 connected to the airbag sheath 18. In the shown embodiments the flap 22 substantially takes the shape of a rectangle stitched to the airbag sheath 18 on one side. The seam 34 used for this purpose is not straight but curved in a special way. More exactly speaking, the path of the seam 34 substantially corresponds to a circular arc of a circle surrounding the exhaust orifice 20 or to a corresponding arc of an ellipse. Also an appropriate angular path is possible and is equally supposed to be covered by the term "curved". The free portion 36 of the flap 22 not fastened to the airbag sheath 18 is connected to the tensile means 24.

FIG. 5 illustrates the flap 22 in an initial state. The tensile means 24 put under tension which is fastened to the tether 26 keeps the flap 22 away from the exhaust orifices 20. This position of the flap 22 therefore can also be referred to as release position.

FIG. 6 illustrates the flap 22 in a state in which it is not retained by the tensile means 24. The tensile forces acting in the airbag sheath 18 when the knee airbag 10 deploys and, resp., is held under tension ensure that the flap 22 is folded onto the exhaust orifices 20. The special curved path of the seam 34 is responsible for the flap 22 being swiveled to the right direction. This position of the flap 22 in which it covers the exhaust orifices thus can be referred to as blocking position.

Referring to FIGS. 1 and 2, the different operating mode of the knee airbag 10 for a short and a normal-sized vehicle occupant is described.

FIG. 1 shows a situation with a short vehicle occupant (corresponding to a 5 percent dummy). The legs 14 and especially the knee 38 of the short vehicle occupant have a particular minimum distance x from the Instrument panel 12 in the seating position and posture usually provided for crash tests. The length of the portion of the tether 26 extending between the opposite walls of the knee airbag 10 including the fold 28 to which the tensile means 24 is fastened is larger than the distance x so that the deployment of the knee airbag 10 in the direction of the vehicle occupant is not restricted by the tether 26 but by the vehicle occupant him-/herself, more exactly speaking by his/her legs 14. The tether 26 is not put under tension or is put under so little tension that the seam 30 does not tear.

This state corresponds to the initial state in which the flap 22 is in the release position (cf. FIGS. 3 and 5). That is to say that the tensile means 24 fastened to the tether 26 and to the free portion 36 of the flap 22 is tensioned and keeps the flap 22 away from the exhaust orifice(s) 20 so that gas may escape from the knee airbag 10. Thus the internal pressure of the knee airbag 10 is reduced so that the Impact of the knees 38 of the short vehicle occupant on the fully inflated knee airbag 10 is dampened.

In FIG. 2 the same situation as in FIG. 1 is shown, however with a normal-sized vehicle occupant (corresponding to a 50 percent dummy). The minimum distance y of the legs 16 and, resp., the knees 40 from the instrument panel 12 related to the usual crash test conditions is larger than the distance x in this case. The length of the portion of the tether 26 including the fold 28 is dimensioned so that on these conditions the portion is tensioned so strongly upon deployment of the knee airbag 10 in the direction of the vehicle occupant that the seam 30 tears and releases the tensile means 24.

Since the tensile means 24 is no longer tensioned, the tensile forces in the airbag sheath 18 and the path of the seam 34 ensure that the flap 22 folds onto the exhaust orifice(s) 20 and closes the same. Thus the internal airbag pressure is kept largely constant so as to ensure a protective effect sufficient for the normal-sized vehicle occupant.

As already mentioned, the design and the arrangement of the knee airbag 10 are geared to the leg and knee positions of the respective crash test dummies (5 percent dummy or 50 percent dummy), as they are predetermined by the seating posture and position of the dummies common in the impact tests (no so called OOP positions).

The FIGS. 8 to 12 relate to a special embodiment different from the afore-described embodiment by the configuration of the closing member (flap 22) and the attachment thereof to the airbag sheath 18.

Figure 8:
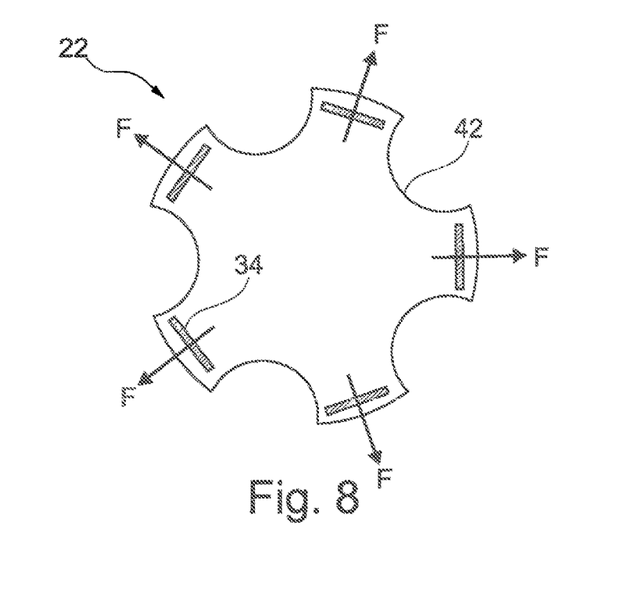
FIG. 8 a top view of a closing member of a knee airbag according to the invention in accordance with a second embodiment.

As is evident from FIG. 8, the flat closing member 22 is substantially circular, wherein at the outer periphery equally spaced semicircular recesses 42 are provided. Viewed in the peripheral direction, only the areas between the recesses 42 are provided with seams 34. The individual seams 34 in total result in a curved path. More exactly speaking, the path of the seams 34 substantially corresponds to an (interrupted) circular arc of a circle surrounding the exhaust orifice 20 or a corresponding arc of an ellipse. Also an appropriate angular path is possible and is supposed to be equally covered by the term "curved".

Figure 9:
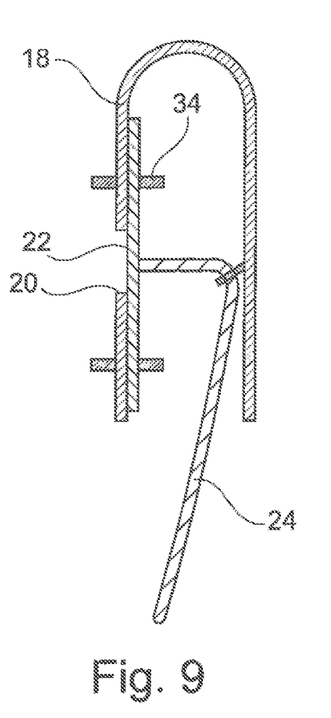
FIG. 9 a detailed sectional view of the knee airbag according to the invention in accordance with the second embodiment with blocked exhaust orifice.

FIG. 9 illustrates the mounting of the closing member 22 on the airbag sheath 18 by the seams 34. The closing member 22 is arranged so that it completely covers the exhaust orifice 20 and no gas or only very little gas can escape from the knee airbag 10 through the exhaust orifice 20. Opposite to the exhaust orifice 20, approximately in the center of the closing member 22, the tensile means 24 acts on the closing member 22 on the side facing away from the exhaust orifice 20.

Figure 10:
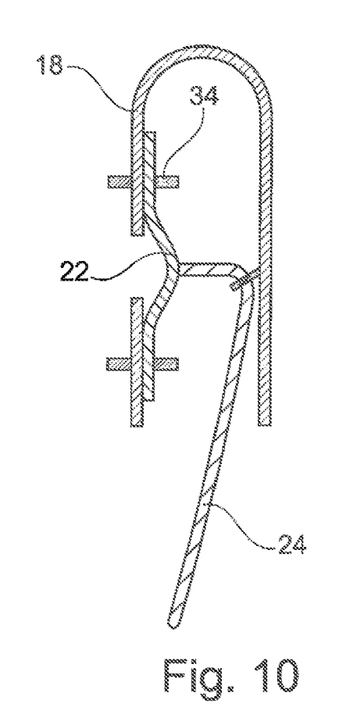
FIG. 10 a detailed sectional view of a knee airbag according to the invention in accordance with the second embodiment with released exhaust orifice.

In contrast to the blocking position of FIG. 9, FIG. 10 shows a situation in which the tensile means 24 is put under tension and partly removes the closing member 22 from the exhaust orifice 20 via a deflection arranged for example on the opposite side. This position of the closing member 22 in which, thanks to the recesses 42, gas may exhaust from the knee airbag 10 through the exhaust orifice 20 corresponds to the release position.

The operating mode of the knee airbag 10 including the control means according to FIGS. 8 to 10 is similar to the afore-described embodiment. When, comparable to the situation shown in FIG. 1, the legs 14 or the knees 38 of a short vehicle occupant (corresponding to a 5 percent dummy) have a particular minimum distance x from the instrument panel 12, the deployment of the knee airbag 10 in the direction of the vehicle occupant is not restricted by the tether 26 but by the vehicle occupant him-/herself. In this event the length of the portion of the tether 26 extending between the opposite walls of the knee airbag 10 including the fold 28 to which the tensile means 24 is fastened by the seam 30 is so much larger than the distance x that the seam 30 is not significantly stressed and does not tear (cf. FIG. 3). Hence the tensile means 24 fastened to the tether 26 and the closing member 22 is put under tension and removes the closing member 22 from the exhaust orifice 20—as illustrated in FIG. 10—so that gas may escape from the knee airbag 10. Thus the internal pressure of the knee airbag 10 is reduced so that the load on the knees 38 of the short vehicle occupant is dampened.

When, on the other hand, comparable to the situation shown in FIG. 2, in the case of a normal-sized vehicle occupant (corresponding to a 50 percent dummy) the minimum distance y of the legs 16 and/or the knees 40 from the instrument panel 12 is larger than the distance x, the portion of the tether 26 including the fold 28 is tensioned so strongly in the direction of the vehicle occupant upon deployment of the knee airbag 10 that the seam 30 tears and the tensile means 24 is released (cf. FIG. 4). Under these circumstances, the tensile forces in the airbag sheath 18 and the internal airbag pressure ensure that the closing member 22 is pressed onto the exhaust orifice 20 and closes the same, as illustrated in FIG. 9. The internal airbag pressure is thus kept largely constant so as to guarantee a protective effect sufficient for the normal-sized vehicle occupant.

In order to meet the described function the closing member 22 need not necessarily be of circular shape. The shape of the recesses 42, too, may deviate from a semi-circle. Basically already one single recess 42 is sufficient as long as the closing member 22 can completely cover the exhaust orifice 20.

In both embodiments the gas escaping through the exhaust orifice(s) 20 can exhaust either directly to the ambience or into an overflow chamber of the knee airbag, as described hereinafter by way of FIGS. 11 and 12.

Related to the flow direction upon filling the knee airbag 10, an overflow chamber 44 of the knee airbag 10 is provided behind the exhaust orifice 20. The overflow chamber 44 is formed by an additional layer 46 that may be attached to the outside of the airbag sheath 18 by a tear seam. The overflow chamber 44 is provided in the lower third of the knee airbag 10.

Figure 11:
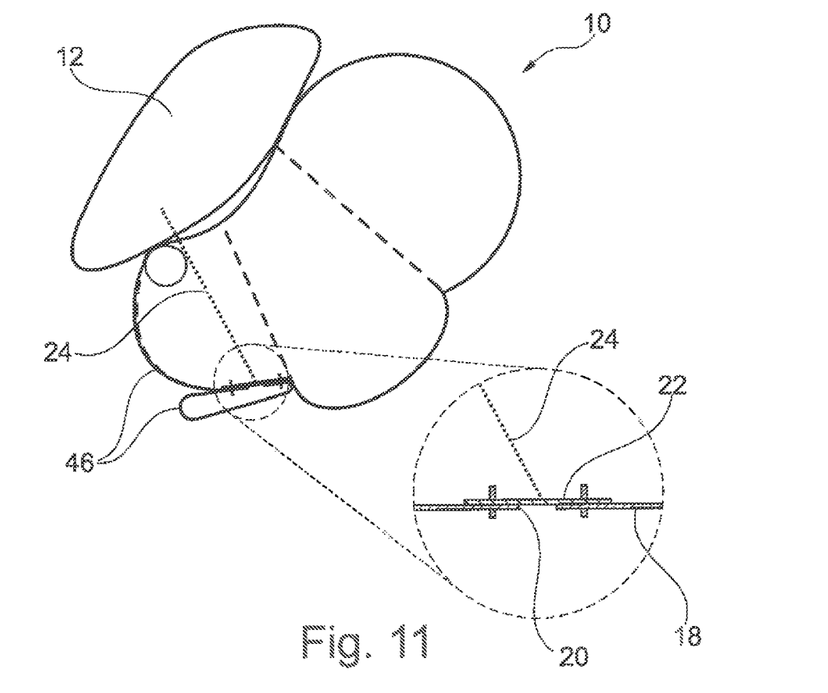
FIG. 11 a lateral sectional view of the knee airbag according to the invention in accordance with the second embodiment with non-filled overflow chamber.

FIG. 11 shows the knee airbag 10 in the inflated state with the exhaust orifice 20 being closed. The overflow chamber 44 is not filled with gas in this case, as no gas can flow past the closing member 22.

Figure 12:
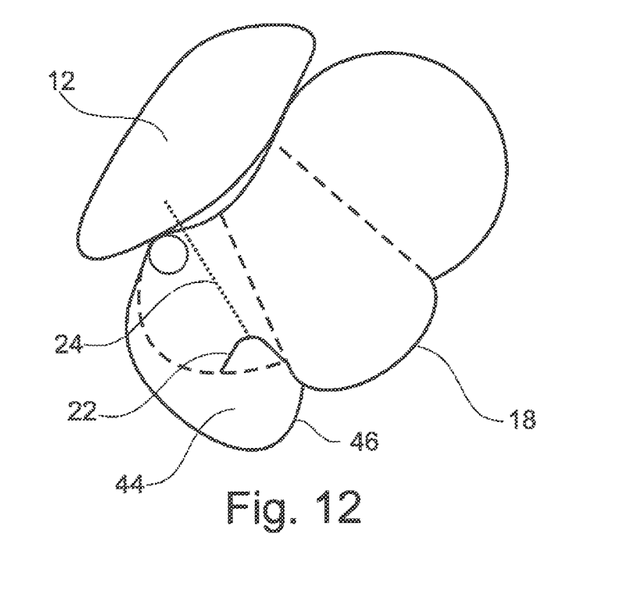
FIG. 12 a lateral sectional view of the knee airbag according to the invention in accordance with the second embodiment with filled overflow chamber.

When the closing member 22 is opened or removed from the exhaust orifice 20, however, i.e. adopts its release position, gas may flow into the overflow chamber 44, as shown in FIG. 12.

Compared to FIGS. 1 and 2, FIGS. 11 and 12 illustrate a variant of the knee airbag 10 in which the overflow orifice 20 is not arranged in the upper third but in the lower third of the knee airbag 10. Moreover, the tensile means 24 is not fastened to a tether but to the instrument panel 12 in this case. The tensile means 24 can act either passively on the closing member 22 or can be actively controlled. In any case the exhaust orifice 20 is released or blocked depending on the expansion of the knee airbag 10 in a particular direction of expansion (especially from the instrument panel 12 to the legs 14, 16 of the vehicle occupant), just as in all embodiments described hereinafter.

In FIGS. 13 and 14 a special embodiment of the knee airbag 10 is shown in which the effective exhaust cross-section of the exhaust orifice(s) 20 is variable. The closing member 22 is in this case formed as a portion 48 of the knee airbag 10 itself which is folded into the inside of the knee airbag 10, as is evident most clearly from FIG. 14a. In the portion 48 one or more exhaust orifice(s) is/are formed; therefore this portion will be referred to as exhaust portion 48 in the following.

Depending on how far the exhaust portion 48 protrudes from the interior of the airbag to the outside, a differently large effective exhaust cross-section is released. The effective exhaust cross-section is adjusted in turn with the aid of the tensile means 24 whose one end is attached to the exhaust portion 48. The other end of the tensile means 24 can be attached, as in the afore-described embodiments, to a tether 26 or to the instrument panel 12 of the vehicle.

Figure 13A:
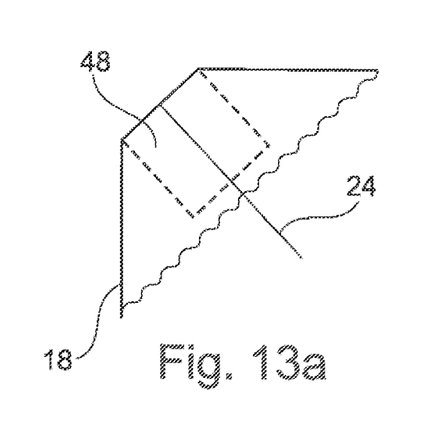
FIGS. 13a to 13d top views of part of a spread knee airbag according to the invention in accordance with a third embodiment with an exhaust orifice released to a different extent.
Figure 13B:
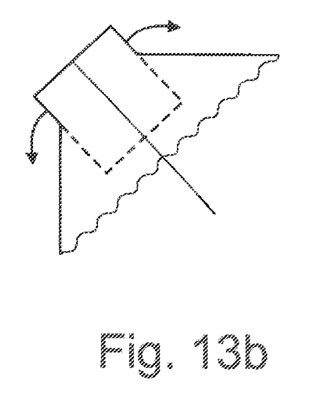
Figure 13C:
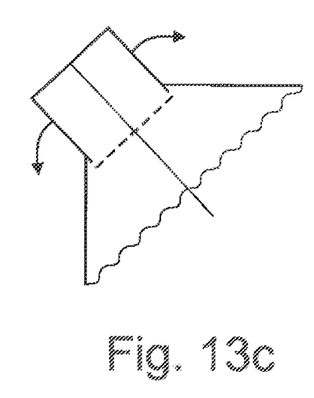
Figure 13D:
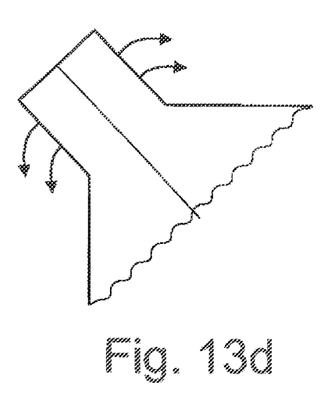
Figure 14A:
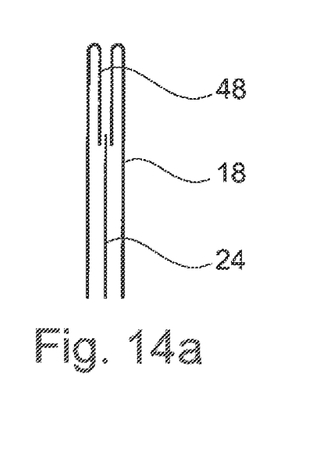
FIGS. 14a to 14d sectional views corresponding to FIGS. 13a to 13d.
Figure 14B:
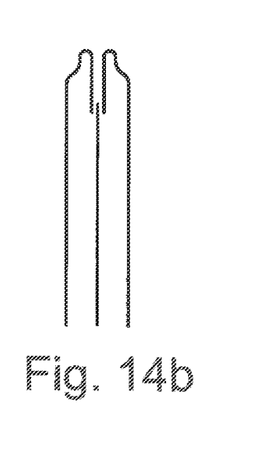
Figure 14C:
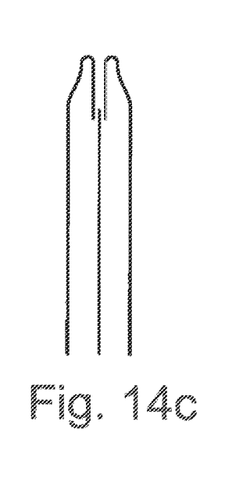
Figure 14D:
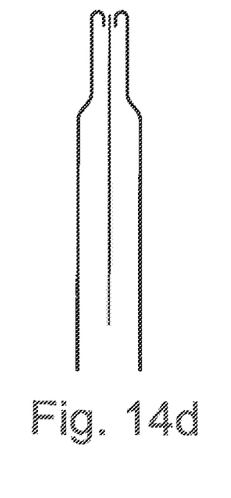

FIGS. 13a and 14a illustrate a situation in which, when the knee airbag 10 is inflated, the tensile means 24 is put under very strong tension and retains the exhaust portion 48 completely inside the airbag. Accordingly, the effective exhaust cross-section is equal to zero and no gas escapes. In the situation shown in FIGS. 13d and 14d the tensile means 24 is not tensioned at all, on the other hand, so that the exhaust portion 48 completely protrudes to the outside. The exhaust cross-section has its maximum size here. FIGS. 13b and 13c and, resp., 14b and 14c show situations between the two extremes in which the tensile means 24 is strongly (FIGS. 13b, 14b) and, resp., weakly tensioned (FIGS. 13c, 14c) and the exhaust cross-section adjusts appropriately.

The exhaust cross-section 48 may also be a separate element connected to the airbag sheath 18.

Another embodiment of the knee airbag 10 is represented in FIGS. 15 through 18. The closing member 22 for blocking and releasing the exhaust orifice(s) 20 in this case is formed similarly to the afore-described embodiment as exhaust portion 48, either as a portion of the knee airbag 10 itself folded into the interior of the knee airbag 10 or as a separate exhaust element connected to the airbag sheath 18.

In this embodiment the tensile means 24 extends in the transverse direction, related to the position of use of the knee airbag 10 in the vehicle, preferably inside a central vertical portion of the knee airbag 10. The tensile means 24 is fastened by one end on the inside of the airbag sheath 18 and by the other end on the exhaust portion 48.

Figure 17:
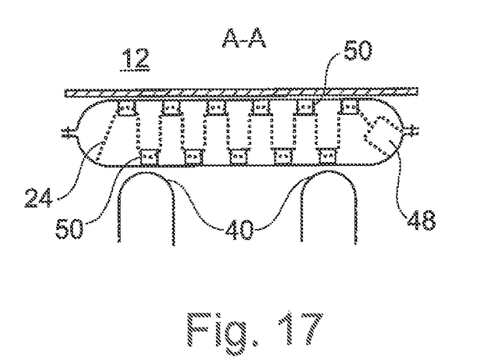
FIG. 17 a sectional view along the line A-A from FIG. 15.

There between the tensile means 24 shows a zigzag path, i.e. the distance of the tensile means 24 from the airbag wall facing the instrument panel 12 and, resp., to the airbag wall facing the legs 14, 16 of the vehicle occupant varies strongly, as is evident most clearly from FIG. 17. This is achieved in the shown embodiment by plural loops 50 arranged in the transverse direction alternately on said airbag walls. The tensile means 24 is guided through the loops 50 like a shoestring so that the zigzag path is resulting.

Figure 15:
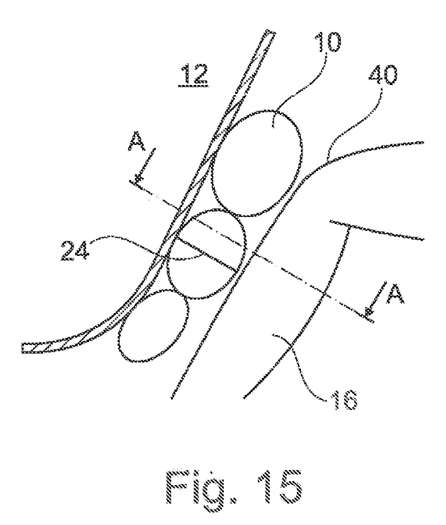
FIG. 15 an interaction of a vehicle occupant with an inflated knee airbag according to the invention in accordance with a fourth embodiment.

FIGS. 15 and 17 illustrate a situation in which the legs 16 and, resp., the knees 40 of a vehicle occupant have a distance from the instrument panel 12 which is so large that the knee airbag 10 can fully deploy. This is usually the case with a normal-sized vehicle occupant adopting a normal seating position. The length of the tensile means 24 is dimensioned so that in the case of the fully deployed knee airbag 10 it is tensioned so strongly that the exhaust portion 48 is retained inside the knee airbag 10. Thus no gas is allowed to exhaust from the knee airbag 10 to the ambience or into a possible overflow chamber.

Figure 16:
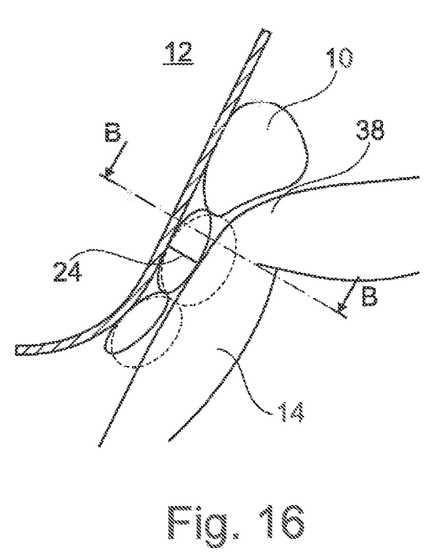
FIG. 16 an interaction of a vehicle occupant seated further forward with an inflated knee airbag according to the invention in accordance with the fourth embodiment.
Figure 18:
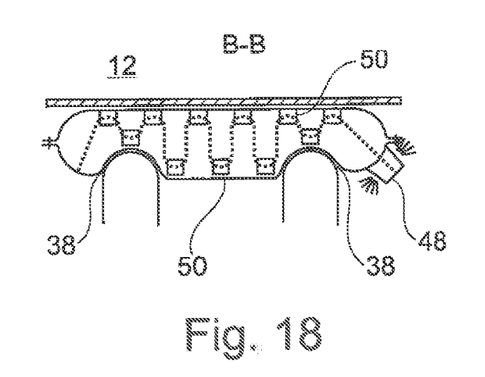
FIG. 18 a sectional view along the line B-B from FIG. 16.

FIGS. 16 and 18 illustrate a situation in which the legs 14 and, resp., the knees 38 of a vehicle occupant have a comparatively small distance from the instrument panel 12. More exactly speaking, the distance is so small that the knee airbag 10 cannot freely deploy, as the legs 14 and, resp., knees 38 penetrate the airbag wall facing them. This can be the case especially with short vehicle occupants who are seated further forward than otherwise usual. Due to the curvatures of the airbag wall facing the legs, the position of at least some loops 50 varies so that the distance of opposite loops is reduced. Thus the tensile means 24 is relaxed as the deflection of the tensile means 24 in total is reduced. As a result the exhaust portion 48 can fold to the outside so that the exhaust orifice(s) 20 is/are released.

The knee airbag 10 can be configured so that also intermediate positions having partly released exhaust orifice(s) are possible corresponding to the afore-described embodiment.

Within the scope of the invention it is possible, as a matter of course, to combine particular aspects of the various embodiments with each other.

LIST OF REFERENCE NUMERALS

10 Knee airbag
12 fixed vehicle component (instrument panel)
14 legs of a short vehicle occupant
16 legs of a normal-sized vehicle occupant
18 airbag sheath
20 exhaust orifice
22 closing member
24 tensile means
26 tether
28 fold
30 tear seam
32 edge portion
34 seam
36 free portion
38 knee of a short vehicle occupant
40 knee of a normal-sized vehicle occupant
42 recesses
44 overflow chamber
46 additional airbag layer
48 exhaust portion
50 loops

The invention claimed is:

1. A vehicle occupant restraint device comprising:
a knee airbag (10) adapted to adopt a deployed position of use between a fixed vehicle component (12) and legs (14; 16) of a vehicle occupant, the knee airbag, comprising:
an airbag sheath (18),
at least one exhaust orifice (20) formed therein, and
a passive control means for selectively releasing the at least one exhaust orifice (20),
wherein the passive control means is disposed inside the knee airbag (10) and is arranged so as to release or block the at least one exhaust orifice (20) in response to an expansion of the knee airbag (10) in a particular direction of expansion;
wherein the particular direction of expansion points from the fixed vehicle component (12) to the legs (14, 16) of the vehicle occupant, and
wherein a length of a portion of a tether (26) extending between opposed walls of the knee airbag (10) is larger than a minimum distance x of the fixed vehicle component (12) from the legs (14) of a short vehicle occupant seated a first distance from the fixed vehicle component but smaller than a corresponding distance y from the legs (16) of a normal-sized vehicle occupant seated a second distance from the fixed vehicle component, the first distance being less than the second distance.

2. The vehicle occupant restraint device according to claim 1, wherein the at least one exhaust orifice (20) is arranged in an upper area of the knee airbag (10) related to the position of use of the knee airbag (10).

3. The vehicle occupant restraint device according to claim 1, wherein an effective exhaust cross-section of the at least one exhaust orifice (20) depends on the expansion of the knee airbag (10) in the particular direction of expansion.

4. The vehicle occupant restraint device according to claim 1, wherein the at least one exhaust orifice (20) opens into an overflow chamber (44).

5. The vehicle occupant restraint device according to claim 1, wherein the passive control means includes a tether (26) adapted to restrict deployment of the knee airbag (10) in the particular direction of expansion.

6. The vehicle occupant restraint device according to claim 5, wherein the tether (26) is fastened on one hand to a portion of the airbag sheath (18) opposite to the vehicle component (12) and on another hand to a portion of the airbag sheath (18) opposite to the vehicle occupant, related to the position of use of the knee airbag (10).

7. The vehicle occupant restraint device according to claim 5, wherein the passive control means further includes a flap as a closing member for selectively closing the exhaust orifice (20) and a tensile means (24) which is coupled on one hand to the tether (26) and on another hand to the closing member (22).

8. The vehicle occupant restraint device according to claim 7, wherein one end of the tensile means (24) is detachably mounted in or on a fold (28) of the tether (26 by a tear seam (30).

9. The vehicle occupant restraint device according to claim 7, wherein the flap (22) includes an edge portion (32) connected to the airbag sheath (18) and a free portion (36) coupled to the tensile means (24).

10. The vehicle occupant restraint device according to claim 9, wherein the edge portion (32) is fastened to the airbag sheath (18) by means of a seam (34) having a curved path.

11. The vehicle occupant restraint device according to claim 10, wherein the path of the seam (34) substantially corresponds to a circular arc of a circle surrounding the at least one exhaust orifice (20) or to a corresponding arc of an ellipse.

12. The vehicle occupant restraint device according to claim 1, wherein the passive control means further includes a closing member (22) for selectively closing the at least one exhaust orifice (20), wherein a tensile means (24), the tension of which depends on the expansion of the knee airbag (10) in the particular direction of expansion, acts on the closing member (22).

13. The vehicle occupant restraint device according to claim 12, wherein the closing member (22) includes on an outer periphery one or more inwardly protruding recesses (42) and in a peripheral direction only an area outside the one or more recesses and, respectively, the areas between the one or more recesses (42) is/are connected to an edge of the exhaust orifice (20).

14. The vehicle occupant restraint device according to claim 12, wherein the closing member (22) is formed by an exhaust portion (48) folded into an interior of the knee airbag (10) in which the at least one exhaust orifice (20) is provided.

15. The vehicle occupant restraint device according to claim 12, wherein the tensile means (24) is arranged between two connecting points so that by an externally caused deformation of the knee airbag (10) a distance between the two connecting points of the tensile means (24) is shortened.

16. The vehicle occupant restraint device according to claim 15, wherein the tensile means (24) is guided through loops (50) which, related to the position of use of the knee airbag (10), are arranged in a transverse direction of the vehicle alternately on an airbag wall facing the fixed vehicle component (12) and on an airbag wall facing the legs (14, 16) of the vehicle occupant.

17. A vehicle occupant restraint device comprising:
a knee airbag (10) adapted to adopt a deployed position of use between a fixed vehicle component (12) and legs (14; 16) of a vehicle occupant, the knee airbag comprising:
an airbag sheath (18),
at least one exhaust orifice (20) formed therein, and
a passive control means for selectively releasing the at least one exhaust orifice (20),
wherein the passive control means is disposed inside the knee airbag (10) and is arranged so as to release or block the at least one exhaust orifice (20) in response to an expansion of the knee airbag (10) in a particular direction of expansion, the passive control means including a tether (26) adapted to restrict deployment of the knee airbag (10) in the particular direction of expansion, the tether being fixedly fastened on one hand to a portion of the airbag sheath (18) opposite to the vehicle component (12) and on another hand fixedly fastened to a portion of the airbag sheath (18) opposite to the vehicle occupant, related to the position of use of the knee airbag (10), the passive control means further including a tensile means (24) connected to the tether (26) at one end and a closing member for blocking the at least one exhaust orifice (20) at another end, the tensile means (24) extending substantially perpendicular to the particular direction of expansion of the tether (26).

18. The vehicle occupant occupant restraint device according to claim 17, wherein terminal ends of the tether (26) are fixedly fastened to the airbag sheath (18).

* * * * *